(12) United States Patent
Welke et al.

(10) Patent No.: US 6,469,407 B2
(45) Date of Patent: Oct. 22, 2002

(54) ELECTRICAL MACHINE WITH A COOLING DEVICE

(75) Inventors: Knut Welke, Sulzheim; Jens Baumeister, Schweinfurt, both of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/867,816

(22) Filed: May 30, 2001

(65) Prior Publication Data

US 2002/0005671 A1 Jan. 17, 2002

(30) Foreign Application Priority Data

May 31, 2000 (DE) .......................................... 100 27 246

(51) Int. Cl.$^7$ ................................................ H02K 9/00
(52) U.S. Cl. ...................... 310/58; 310/60 A; 310/216; 310/25; 310/259
(58) Field of Search .............................. 310/58, 59, 54, 310/60 A, 52, 216, 217, 258, 259, 260

(56) References Cited

U.S. PATENT DOCUMENTS

| | | | | |
|---|---|---|---|---|
| 4,691,131 A | * | 9/1987 | Nakano | ........................ 310/54 |
| 5,939,806 A | * | 8/1999 | Kim et al. | ................. 310/60 A |
| 6,191,511 B1 | * | 2/2001 | Zysset | ....................... 310/60 A |

FOREIGN PATENT DOCUMENTS

| | | |
|---|---|---|
| DE | 47 234 | 4/1966 |
| DE | 41 07 399 | 9/1992 |
| DE | 36 35 297 | 3/1993 |
| DE | 44 11 055 | 7/1997 |
| DE | 297 17 128 | 1/1998 |
| DE | 19742255 | * 11/1998 ............ H02K/9/16 |
| DE | 197 57 605 | 6/1999 |
| EP | 0 503 093 | 9/1992 |
| EP | 0 925 839 | 6/1999 |

OTHER PUBLICATIONS

Patent Abstracts of Japan, Publication No. 59035548 A, Feb. 27, 1984, Kamiyama et al.
Patent Abstracts of Japan, Publication No. 09233766 A, Sep. 5, 1997, Matsuoka et al.

* cited by examiner

*Primary Examiner*—Karl Tamai
*Assistant Examiner*—Thanh Lam
(74) *Attorney, Agent, or Firm*—Cohen, Pontani, Lieberman & Pavane

(57) ABSTRACT

An electrical machine with a cooling system for the removal of waste heat includes a stator laminated core having a plurality of first sheet metal laminations stacked to form a first core part having a plurality of axial passages arranged on a reference circle which is concentric to a central axis, and a plurality of second sheet metal laminations stacked to form a second core part having a plurality of axial recesses which are also on the reference circle. The second core part abuts the first core part so that the passages are axially aligned with the recesses. Each passage receives a cooling duct which is connected to an adjacent cooling duct by a return element having radially extending legs received in respective axial recesses, the legs being connected by a peripherally extending center section. Where the stator laminated core is located centrally of a rotor hand has a concentric internal space, the center section of each return element is located in the internal space.

14 Claims, 8 Drawing Sheets

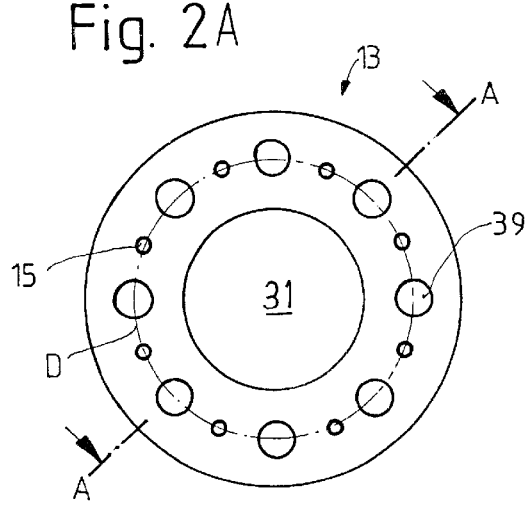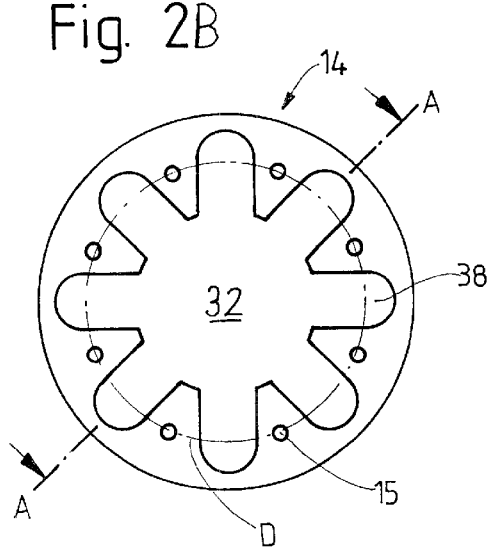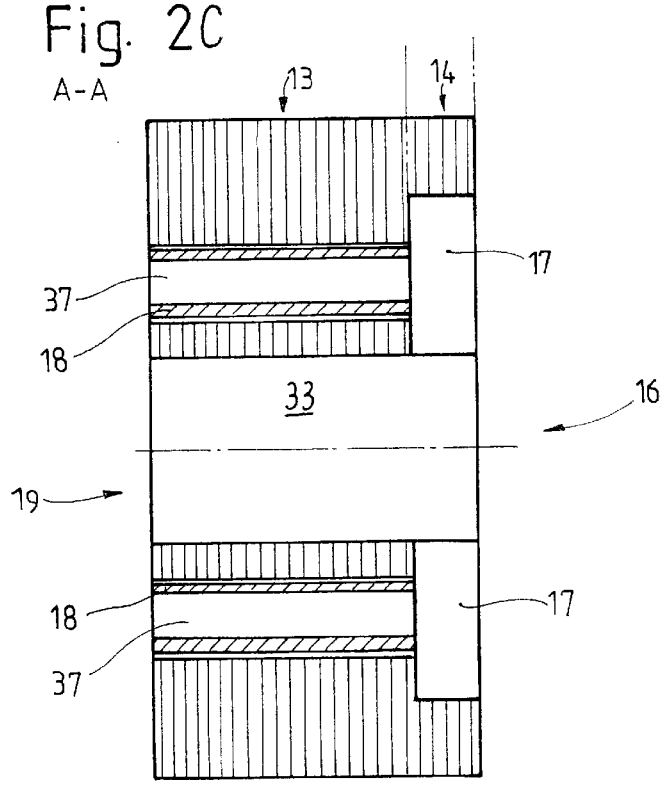

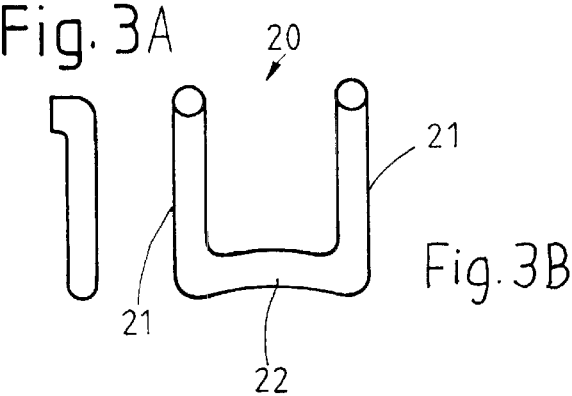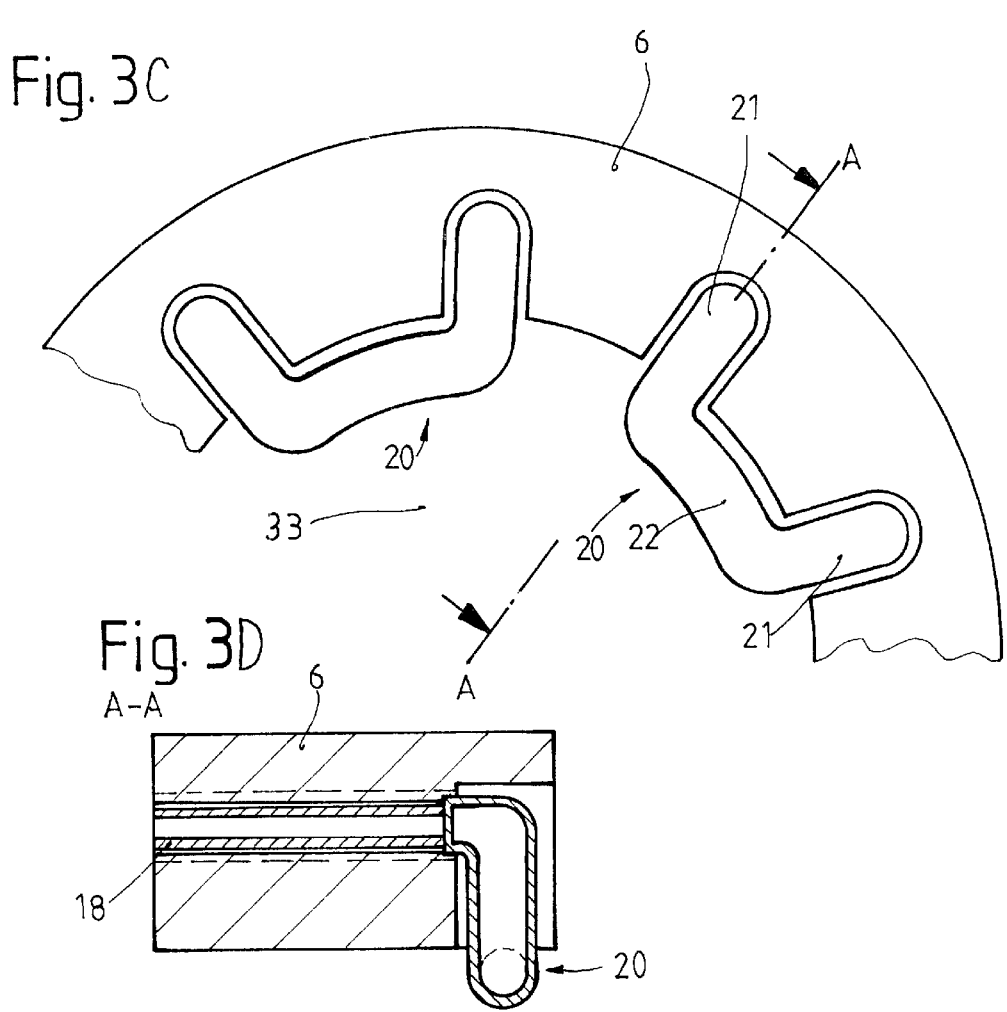

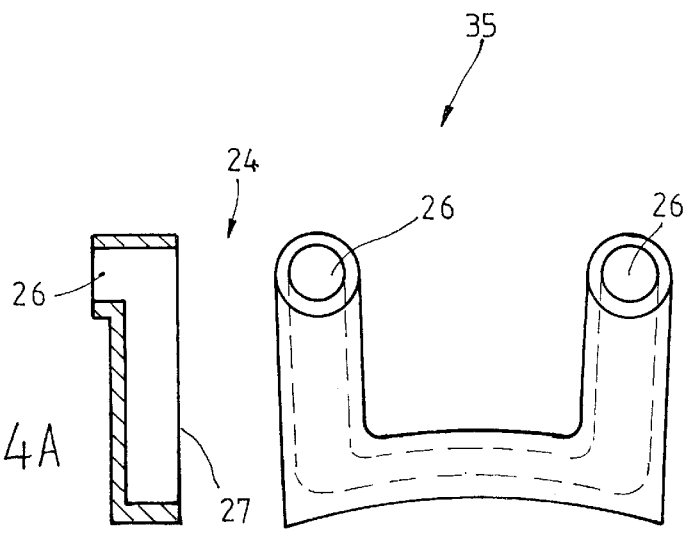
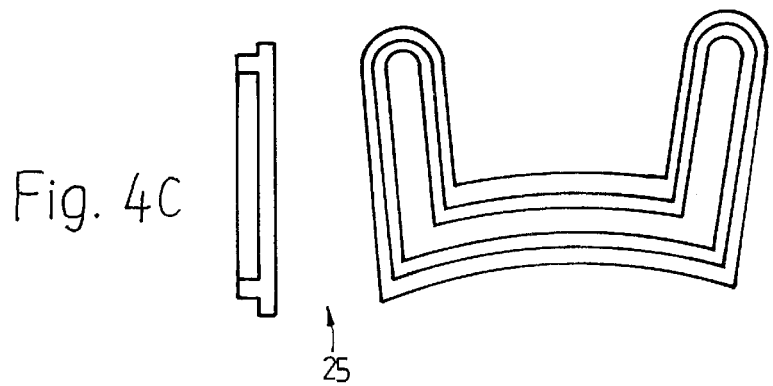
Fig. 4A Fig. 4B Fig. 4C Fig. 4D

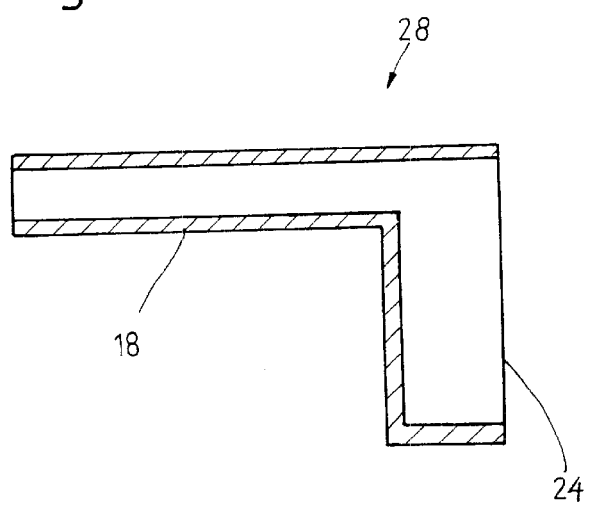
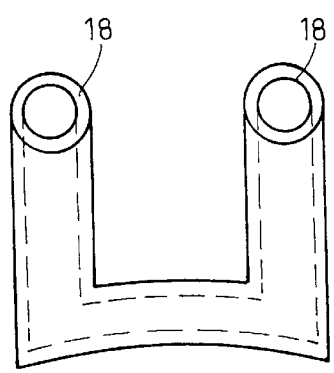
Fig. 5A
Fig. 5B

ELECTRICAL MACHINE WITH A COOLING DEVICE

BACKGROUND OF THE INVENTION

1. Field of the Invention

The invention relates to an electrical machine with a cooling device for the removal of waste heat, having a stator with a stator laminated core having recesses for cooling ducts which carry a cooling medium, the cooling ducts being connected by at least one return element.

2. Description of the Related Art

During the operation of an electrical machine for the conversion of electrical energy into mechanical energy or vice versa, heat losses occur. In order to protect the machine from damage, these undesirable heat losses must be removed from the machine. For this purpose, it is current practice to provide electrical machines with a cooling device in which, for example, a flowing coolant accepts the heat due to the losses and transports it away from the electrical machine to a heat exchanger. The employment of such a cooling device also permits the power of the electrical machine to be substantially increased.

In the case of electrical machines in installations which themselves generate waste heat, as in the field of automobile technology in the case of a combination with an internal combustion engine, great effort must be made to remove the waste heat. In addition, the present development of motor vehicles—from the point of view of fuel saving and reduced emission with a limited amount of installation space available—demands particularly efficient electrical machines, which are compact in construction and economical in weight.

DE 197 57 605 discloses an internal rotor electric motor with cooling ducts cast into the stator laminated core and extending in the axial direction. The end plates arranged at the end surfaces of the stator laminated core have penetrations, through which the axial cooling ducts are led out of the stator laminated core and connected to one another by means of tubular return elements.

In addition, EP 0 925 839 A1 describes an electric motor of internal rotor type whose casing has axial cooling ducts which are flow-connected with one another by means of return elements which can be attached to the casing and by recesses in the end plates.

The disadvantage of the two solutions mentioned, is that due to the end surface return elements, the axial installation length of the electrical machine is determined by the cooling device rather than by the electrical part.

SUMMARY OF THE INVENTION

The invention is based on the object of providing an electrical machine, with a cooling device, which has the smallest possible axial installation length.

Due to the design of the stator laminated core having return elements arranged elements according to the invention, an electrical machine can be constructed in a very compact manner. The axial installation space gained can be used for the arrangement of further functional units, for example in the strictly limited engine compartment of a motor vehicle.

In the case of an electrical machine of the external rotor type, it is particularly advantageous for the return element section extending essentially in the peripheral direction to be arranged radially on the inside relative to the stator laminated core. The concentric internal space of the stator laminated core present in the case of an external rotor can be used, without special measures, for the arrangement of the return elements.

In addition, configuring the return element within the axial extent of the stator laminated core is a particularly space-saving arrangement.

In a further advantageous embodiment, the return element connects adjacent cooling ducts in pairs. This avoids any hydraulic short-circuit.

A particularly simple variant, from the point of view of manufacturing technology, provides for a tubular return element. This can be easily pushed onto adjacent cooling ducts and connected to the latter in a manner so as to seal.

For the manufacture of the return element, it is likewise useful for the latter to be configured with a plurality of parts, i.e. with at least one channel part and at least one closing part which closes the channel part so as to seal it.

In a particularly simple embodiment, the closing part consists of a plastic. For the closing of a channel part so as to seal it, the closing part in plastic can, for example, have a press fit and be pressed into the channel part in a simple manner.

A particular advantage results if the channel part of a return element is integrally configured with the cooling ducts extending in the stator laminated core and being in flow connection with the channel part. This permits the number of parts in the cooling device to be essentially reduced and low-cost manufacture is made possible.

In a particularly advantageous manner, the channel part with the cooling ducts extending in the stator laminated core and being in flow connection with the channel part is embodied as a cast part or molded part. The cast or molded material can in this case be in particularly close contact with the contour of the stator laminated core, which arrangement effects a particularly effective removal of heat due to the cooling device when the electrical machine is in operation.

A plurality of channel parts of the return elements, arranged radially relative to the stator laminated core can advantageously be connected to one another by means of holding segments. The mechanical stability of the cooling device can be markedly improved by this measure.

In addition, it is also useful for a plurality of closure parts to be integrally configured in the form of a cover, which closes a plurality of channel parts so that they are sealed. By this means, the number of assembly steps necessary for the manufacture of the electrical machine can be reduced and an electrical machine can be manufactured in a shorter time.

The openings for the cooling ducts and connecting means in the stator laminated core are advantageously arranged on a common reference circle. When stamping the individual laminations, for example, this provides the advantage that the number of stamping patterns and tools can be kept small.

A further advantageous embodiment of the invention provides for a plurality of cooling ducts, which are separated from one another with respect to flow, to be connected in pairs by return ducts extending essentially in the peripheral direction. These return ducts are formed on a flange part on the end surface of the stator laminated core opposite to the return elements so that the cooling ducts are sealed. The return ducts in this flange part can be manufactured by milling from a solid material or by deep-drawing a sheet-metal part.

It is advantageous to configure the flange part, in a further function, as a stator support. By this means, an additional part functioning as a stator support can be omitted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2a is a plan view of a first sheet metal lamination;

FIG. 2b is a plan view of a second sheet metal lamination;

FIG. 2c is an axial section through a stator laminated core manufactured from these sheet-metal laminations;

FIGS. 3(a–c) provide a representation of a tubular return element and its arrangement on a stator laminated core according to the invention;

FIG. 4a is a side section of the channel part of a multi-part return element;

FIG. 4b is an end view of the channel pat of the multi-part return element;

FIG. 4c is a side section of the closing part of the multi-part return element;

FIG. 4d is an end view of the closing part of the multi-part return element;

FIG. 5a is side section of a channel part with integral cooling ducts;

FIG. 5b is an end view of the channel part with integral cooling ducts;

DETAILED DESCRIPTION OF THE PRESENTLY PREFERRED EMBODIMENTS

Figure 1:
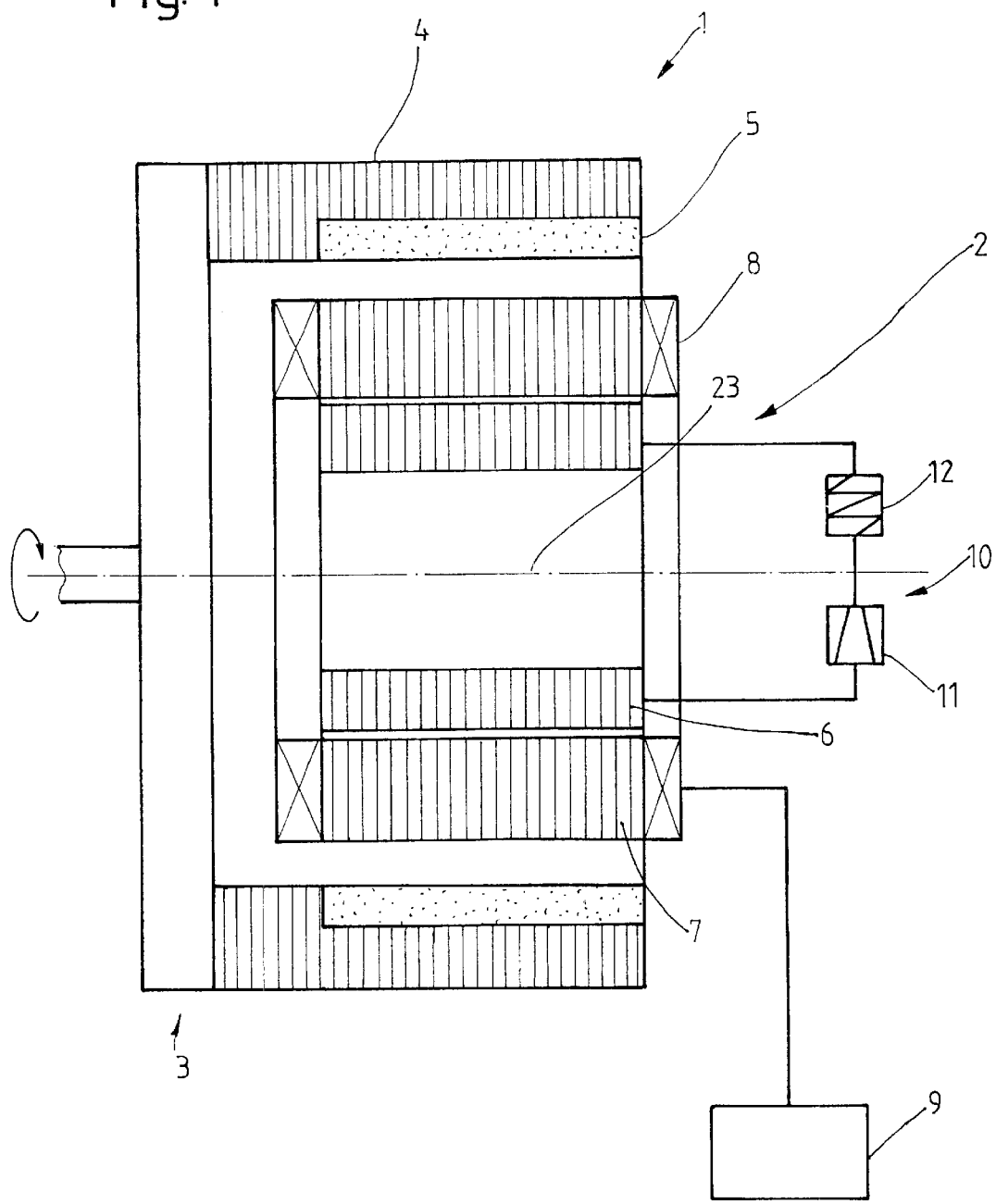
FIG. 1 shows a diagrammatic representation of an electric motor of the external rotor type.

Firstly, and for general understanding of the invention, FIG. 1 shows a diagrammatic representation of an electrical machine 1 of an external rotor type. Such an electrical machine, which can be configured as a synchronous machine excited by permanent magnets, has a stator 2 and a rotor 3. The rotor 3 comprises a laminated core 4 which has a plurality of permanent magnets 5 on the inner peripheral surface. The stator 2 comprises a further laminated core 6 which carries a number of winding teeth 7 radially on the outside. At least one electrical winding in the form of a coil 8 is arranged in grooves between these winding teeth. The windings are associated with individual electrical conductors, the windings associated with a common conductor being wired together and connected, by means of corresponding electrical connections and contacts, to power electronics 9 for controlling the electrical machine. When a current flows through these windings, the magnetic field of the electrical machine and, as a result, a drive motion are generated by it. The stator core 6 also has an internal space 33 which is concentric to the rotational axis 23 of the rotor 3. The electrical machine is also equipped with a cooling device 10 which transfers, to a cooling fluid, the heat generated during operation of the electrical machine. This cooling fluid is transported by means of a cooling pump 11 to a heat exchanger 12 where the fluid is cooled.

The embodiment, according to the invention, of the cooling device 10 on the stator 2 is described in detail below. The stator laminated core 6 is usually made of a plurality of identical sheet-metal laminations connected together. In contrast to this, the invention makes use of a plurality of non-identical sheet-metal laminations for forming the stator laminated core 6. In this connection, FIG. 2a shows a first sheet-metal lamination 13 having first apertures 39 distributed around a central aperture 31. FIG. 2b shows a second sheet-metal lamination 14 having second apertures 38 distributed around a central aperture 32. The first apertures 39 are distributed in the peripheral direction around a reference circle D which is concentric to the central space 31. The second apertures 38 which open on the central space 32 and are arranged on a reference circle D identical with that of the first sheet-metal lamination 13. The distribution of apertures 38 in the peripheral direction corresponds to that of the first apertures 39. In addition, openings 15 for connecting means are provided on the sheet-metal laminations 13 and 14 which are likewise distributed on the reference circle D in an identical manner on the two sheet-metal laminations. The connecting means are used for connecting the first and second sheet-metal laminations 13 and 14, and for fastening a stator support to the stator laminated core 6.

In order to form the stator laminated core 6, the first sheet-metal laminations 13 are layered together to form a first core section with the first apertures 39 aligned and with the openings 15 aligned, and the second laminations 14 are layered together to form a second core section with the second apertures 38 aligned and with the openings 15 aligned. The first and second core sections are subsequently brought together, as shown in FIG. 2c, so that their central apertures 31 and 32 as well as apertures 38 and 39 and their openings 15 are aligned. The apertures 31 and 32 form the concentric internal space 33 of the core. The apertures 38 form passages 37, and the apertures 39 form recesses 17 in end surface 16 of the stator laminated core 6. It is also conceivable to stack the sheet-metal laminations 13 and 14 in such a way that further recesses 17 also occur on the end surface 19 opposite to the end surface 16. In alignment with recesses 17, cylindrical passages 37, which have cooling ducts 18, extend in the axial direction.

The recesses 17 of the stator laminated core 6 accommodate the return elements of the cooling device. In this connection, a first variant of a tubular return element 20 bent in U-shape is represented in FIG. 3a; this return element 20 has two legs 21 and a central section 22. The return element 20 can consist of a metallic material or a plastic.

FIG. 3b shows the arrangement of a return element 20 on the stator laminated core 6 of an external rotor. In this arrangement, the legs 21 extend essentially radially inward and the central section 22 extends essentially in the peripheral direction. The central section 22 is arranged, in the exemplary embodiment shown, in the central space 33 radially inside the stator laminated core 6. In the case of the external rotor shown, this installation position is particularly advantageous because the stator central space 33 is free from functional elements of the electrical machine (see also FIG. 1). In FIG. 3c, it may also be seen that the return element 20 is received within the axial extent of the stator laminated core 6.

In the case of an electrical machine (not shown) having an external stator and an internal rotor, on the other hand, it is advantageous to arrange the legs 21 radially outward and to position the central section 22 radially outside relative to the stator laminated core 6.

As may also be seen from FIG. 3b, cooling ducts of the stator laminated core 6 adjacent to one another in pairs are flow-connected by the return element 20. This connection can, for example, take place by material combination, by brazing, or as a form fit by pressing in.

Another advantageous embodiment of a return element is represented in FIGS. 4a14d. In this case, the return element 35 is configured in two parts and consists of a channel part 24 (FIGS. 4a and 4b) and a closing part 25 (FIGS. 4c and 4d). The channel part 24 has, at its ends, two openings 26 for connection with two adjacent cooling ducts 18 of the stator laminated core 6 (see FIG. 2c). The upper surface 27 of the channel part 24 is closed by the closing part 25 so that it is sealed. The channel part 24 and the closing part 25 can be manufactured by a casting or molding process. The channel part 24 preferably consists of a metal or a metal alloy. The closing part 25 preferably consists of a material which is more flexible than that of the channel part 24, for example a heat-resistant plastic, and it can, for example, be connected to the channel part 24 by shaping matched to the latter.

A further embodiment of a part of a return element, which is configured integrally and designated by 28, is represented in FIG. 5. This part of the return element results from the combination of a channel part 24 and two cooling ducts 18. This variant can be manufactured particularly easily by a casting or molding process.

Figure 6:
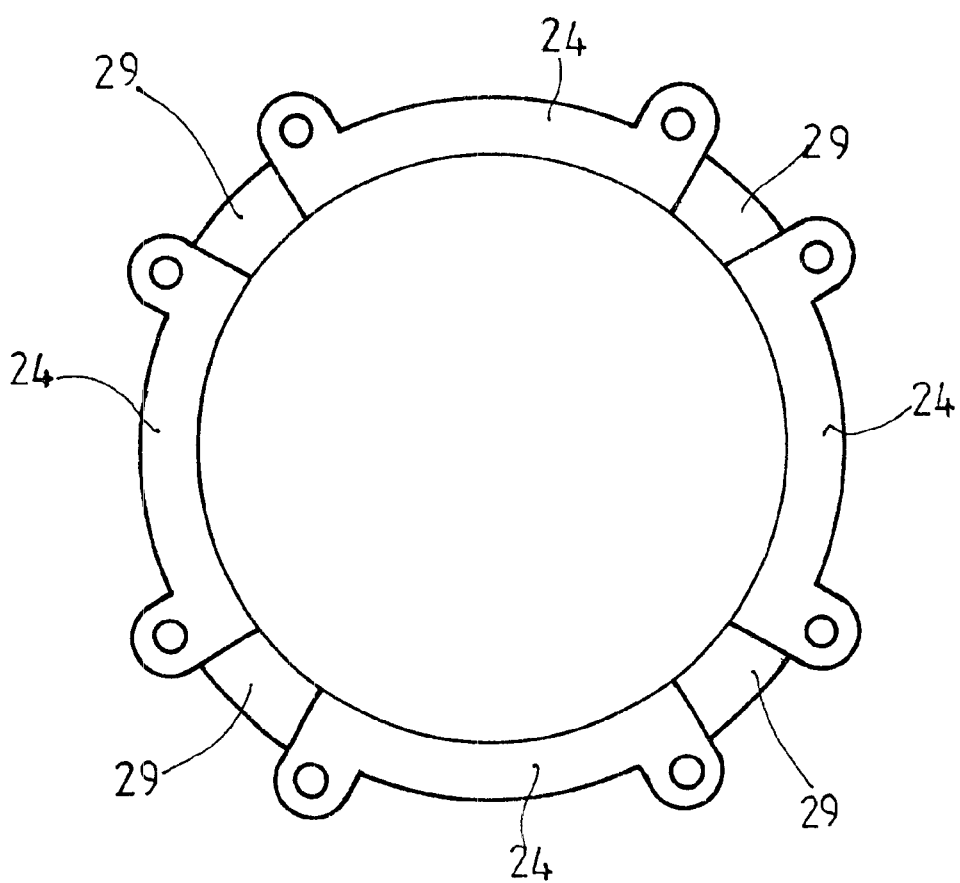
FIG. 6 is a representation of a plurality of channel parts which are connected to one another by holding segments.

As a development of the variant shown in FIGS. 4a and 4b, a plurality of channel parts 24 are connected to each other by holding segments 29 in FIG. 6.

Figure 7:
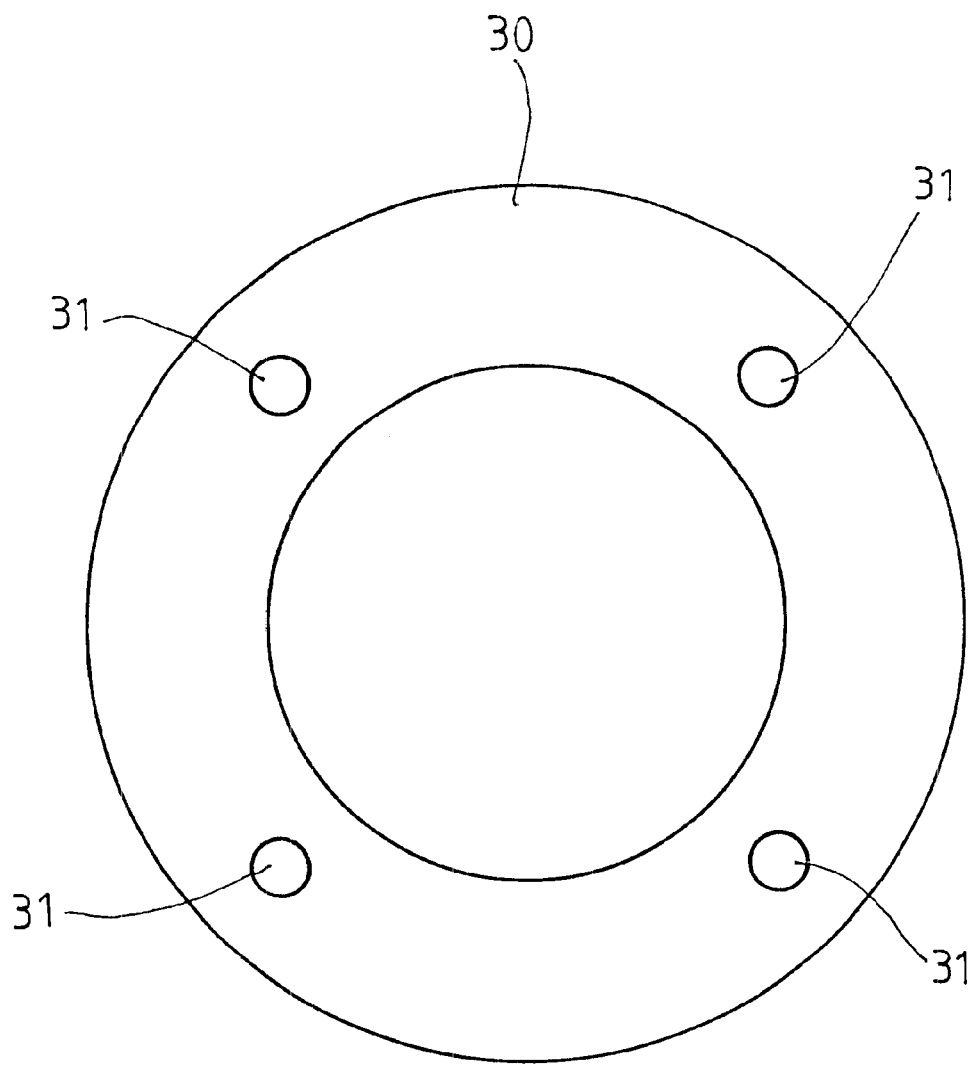
FIG. 7 is a representation of a cover for the simultaneous closing of a plurality of channel parts.

In principle, it is likewise possible for a plurality of closing parts 25 (FIGS. 4c and 4d) to be connected to each other. As a very simple embodiment, FIG. 7 shows a cover 30, which can have a sealing means (not shown) on the side directed toward the return elements, by means of which the covered channel parts can be closed so that they are sealed. The cover 30 can have openings 31 at locations at which it does not cover a channel part 24, by means of which openings the cover can be fastened by connecting means to, for example, the stator laminated core 6.

Figure 8:
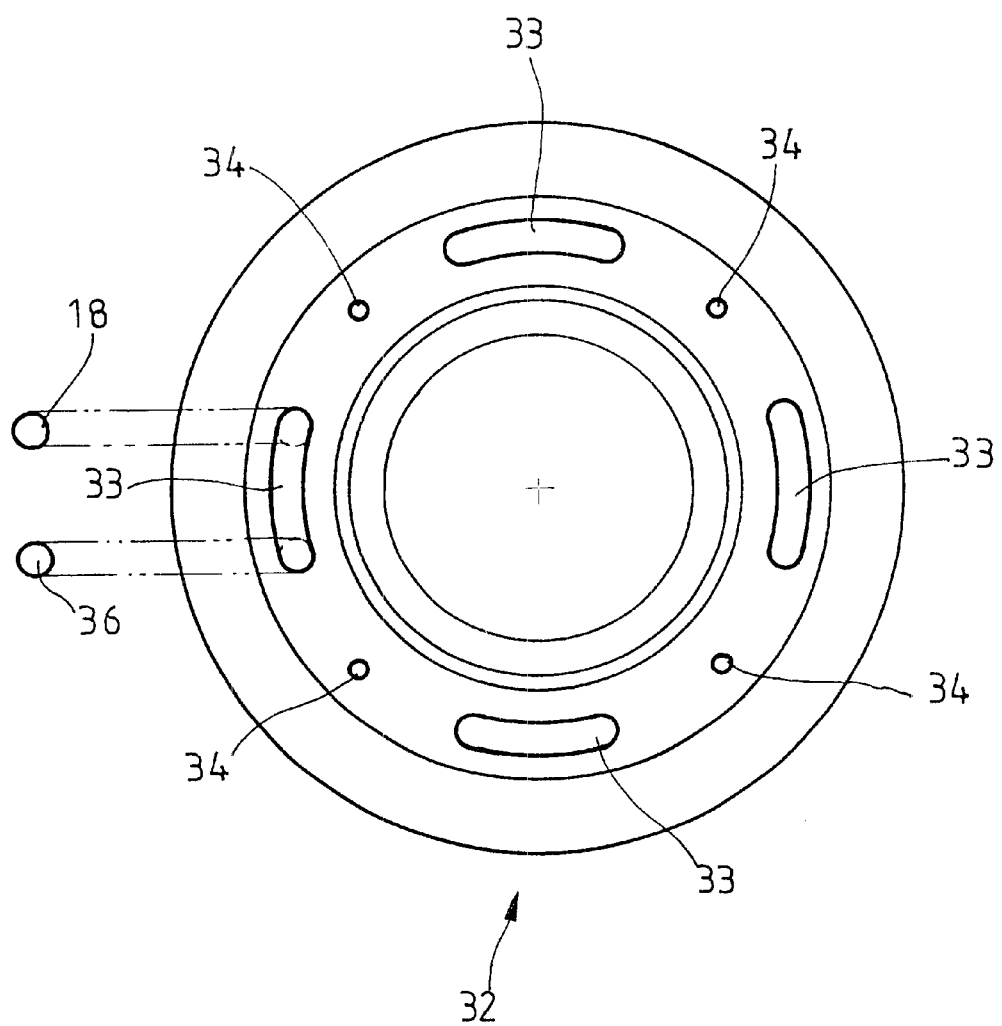
FIG. 8 is a representation of a flange element with return ducts.

FIG. 8 shows the way in which the cooling ducts 18 and 36, which are separated with respect to flow, are connected on the end surface 19 of the stator laminated core 6, opposite to the return elements 20. For this purpose, the electrical machine has a flange part 32 on which are formed return ducts 33 extending essentially in the peripheral direction. These return ducts 33 connect adjacent cooling ducts 18 and 36 in pairs in such a way that, in association with the return elements 20, a through-flow connection of the cooling ducts of the electrical machine can be produced. The flange part 32 which can, in addition, have a sealing means (not shown) for sealing the cooling system 10, possesses openings 34 for connecting means for fastening to the stator laminated core 6.

As is shown in FIG. 8, the flange part 32 can be manufactured from a solid material, for example as a cast part. This embodiment of the flange part offers the possibility that the flange part can simultaneously be used as a stator support and can provide a connection to further functional units, for example in a drive train of a motor vehicle. As an alternative to this, the flange part 32 can also be present, in a particularly weight-saving manner, as a sheet-metal part.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An electrical device comprising a stator laminated core, said stator laminated core comprising
    a plurality of first sheet metal laminations stacked to form a first core part, said first sheet metal laminations each having a plurality of first apertures, said first apertures being aligned to form a like plurality of axial passages through said first core part,
    a plurality of second sheet metal laminations stacked to form a second core part, said second sheet metal laminations each having a plurality of second apertures, said second apertures being aligned to form a like plurality of axial recesses in said second core part, said second core part axially abutting said first core part so that each said recess is aligned with a respective said passage,
    an axial cooling duct in each said passage, and
    at least one return element comprising a pair of radially extending legs connected to a respective pair of said cooling ducts, and a peripherally extending central section connecting said legs, each said leg being axially contained within a respective said recess, said central section being situated radially with respect to said stator laminated core.

2. An electrical device as in claim 1 wherein said stator laminated core is located centrally of a rotor and defines a concentric internal space, said central section of said at least one return element being located in said internal space.

3. An electrical device as in 1 wherein each said return element connects an adjacent pair of said cooling ducts.

4. An electrical device as in claim 1 wherein said return element is tubular.

5. An electrical device as in claim 1 wherein said return element comprises a channel part and a closing part which closes the channel part so as to seal it.

6. An electrical device as in claim 5 wherein said closing part is made of plastic.

7. An electrical device as in claim 6 wherein said channel part is formed integrally with said respective pair of said cooling ducts.

8. An electrical device as in claim 5 wherein said channel part is one of a cast part and a molded part.

9. An electrical device as in claim 5 comprising a plurality of said channel parts and a plurality of holding segments holding said channel parts with respect to said core, each said holding segment being located between a respective pair of said channel parts.

10. An electrical device as in claim 5 comprising a plurality of said channel parts and a respective plurality of said closing parts, said plurality of closing parts being integrally configured as a cover which seals said channel parts.

11. An electrical device as in claim 1 wherein said first apertures and said second apertures are arranged on a common reference circle.

12. An electrical device as in claim 11 further comprising a plurality of openings in each of said first and second sheet metal laminations, said openings in each said lamination being arranged on said common reference circle, said openings being axially aligned to form a plurality of connecting holes through said core.

13. An electrical device as in claim 1 wherein said recesses are located at one end of said core, said device further comprising a plurality of return ducts connecting respective pairs of cooling ducts at the opposite end of said core.

14. An electrical device as in claim 13 wherein said return ducts are integrally formed on a flange part which seals said cooling ducts.

* * * * *